United States Patent
Cifarelli et al.

(10) Patent No.: US 11,798,019 B2
(45) Date of Patent: Oct. 24, 2023

(54) DYNAMIC POPULATION ADJUSTMENTS FOR A GROUP

(71) Applicant: NCR Corporation, Atlanta, GA (US)

(72) Inventors: Claudio Cifarelli, Rome (IT); Diego De Cao, Ciampino (IT)

(73) Assignee: NCR Corporation, Atlanta, GA (US)

( * ) Notice: Subject to any disclaimer, the term of this patent is extended or adjusted under 35 U.S.C. 154(b) by 158 days.

(21) Appl. No.: 17/186,492

(22) Filed: Feb. 26, 2021

(65) Prior Publication Data

US 2022/0277334 A1    Sep. 1, 2022

(51) Int. Cl.
*G06Q 30/02* (2023.01)
*G06Q 10/067* (2023.01)

(52) U.S. Cl.
CPC .......... *G06Q 30/02* (2013.01); *G06Q 10/067* (2013.01)

(58) Field of Classification Search
CPC .. G06Q 30/02; G06Q 30/0211; G06Q 10/067; G06Q 30/0254; G06Q 30/0246; G06Q 30/0207
See application file for complete search history.

(56) References Cited

U.S. PATENT DOCUMENTS

| | | | |
|---|---|---|---|
| 8,909,646 B1 * | 12/2014 | Fabrikant | G06Q 50/01 707/758 |
| 2008/0021909 A1 * | 1/2008 | Black | G06Q 30/0269 |
| 2009/0144201 A1 * | 6/2009 | Gierkink | G06Q 30/0246 705/40 |
| 2009/0254412 A1 * | 10/2009 | Braswell | G06Q 30/0251 705/14.1 |

(Continued)

FOREIGN PATENT DOCUMENTS

| | | | | |
|---|---|---|---|---|
| AU | 2013200803 A1 * | 8/2018 | | G06Q 30/02 |
| CA | 2958627 A * | 8/2017 | | A61B 5/00 |

(Continued)

OTHER PUBLICATIONS

C Doi;M Katagin;A Ishii;T Konishi;T Araki;K Ohta;D Ikeda;H Inamura; H Shigeno, Estimating Customer preference through store check-in histories and its use in visitor promotion (English), 2017/ Tenth International Conference on Mobile Computing and Ubiquitous Network (ICMU) (pp. 1-6), Oct. 1, 2017 (Year: 2017).*

(Continued)

*Primary Examiner* — Marilyn G Macasiano
(74) *Attorney, Agent, or Firm* — Schwegman Lundberg & Woessner, P.A.

(57) ABSTRACT

An initial small group of customers are randomly selected for participation in a campaign associated with a promotion. Transactions of the group are monitored for a redemption of the promotion. A redeeming member's transaction is modeled and mapped into a multidimensional space and transactions for customers not included in the group are modeled and mapped into the space. A neighborhood of the redeeming member and select ones of the customers not included in the group are detected as emerging from the space. Most similar customers to the redeeming member are determined from the neighborhood and a preconfigured number of the most similar customers are selected for inclusion within the group for the campaign. This process continues until a goal of the campaign is reached or the campaign is ended.

17 Claims, 3 Drawing Sheets

(56) References Cited

U.S. PATENT DOCUMENTS

| | | | | |
|---|---|---|---|---|
| 2014/0279053 A1* | 9/2014 | Lee | ................... | G06Q 30/0275 |
| | | | | 705/14.71 |
| 2015/0046223 A1* | 2/2015 | Sewak | ............... | G06Q 30/0202 |
| | | | | 705/7.31 |
| 2018/0341987 A1* | 11/2018 | Marella | .............. | G06Q 30/0269 |
| 2020/0143414 A1* | 5/2020 | Li | ........................... | G06N 5/01 |

FOREIGN PATENT DOCUMENTS

| | | | | | |
|---|---|---|---|---|---|
| NZ | | 524093 A | * | 1/2005 | ............. G06Q 30/00 |
| WO | WO 2016/025291 A1 | * | 2/2016 | ............. G06Q 30/02 |

OTHER PUBLICATIONS

Auon Haidar Kazmi; Gautam Shroff; Puneet Agarwal, Generic Framework to Predict Behavior of Customers Using Their Transaction History (English), 2016 IEEE/WICA?ACM International Conference on Web Intelligence (WI) ) pp. 449-452), Oct. 1, 2017 (Year: 2017).*

Giridhar Maji; Soumya Sen, Data warehouse based analysis on CDR to retain and acquire customers by targeted marketing 9English),2016 5th International Conference on Reliability, Infocom Technologies and Optimization (Trends and Future Directions), Sep. 2016 (Year: 2016).*

\* cited by examiner

DYNAMIC POPULATION ADJUSTMENTS FOR A GROUP

BACKGROUND

Many scenarios require the use of a group. Advertisers use focus groups to determine likes and dislikes of a demographic group of consumers. Politicians use focus groups to determine the likability of a candidate or supportability of a particular political issue. Retailers use groups to target promotions for marketing campaigns. Health organizations us groups to determine the efficacy of certain drugs vis-a-vis placebos, healthy habits, mortality of individuals with pre-existing conditions, and so on.

Formation of some groups may be random within a given demographic or may be formed with a great deal of selection criteria. For the most part, once the group is formed for study and evaluation, the group remains static and does not change based on conditions or outcomes discovered during the study or the evaluation. In some cases, this is intentionally desired particularly with respect to health studies and evaluations but most of the other types of studies would greatly benefit by continually evaluating the conditions that initially defined the population of the group and modifying what defines the population based on outcomes as the study or evaluation progresses.

Initial selection of a group to study is largely based on a number of prerequisites/assumptions about the population of the group, such as males between the ages of 25 and 55, married couples with a combined household income above $100,000, etc. The problem is that additional characteristics or attributes of the initial group may become more apparent as outcomes of the study commences, such that these additional characteristics or attributes have a higher correlation to desired outcomes of the study. For example, males ages 25 and 55 that are employed (an attribute discovered during the study), married couples with a combined household income above $100,000 who have children (a characteristic discovered during the study), etc.

Significant effort is made to identify characteristics or attributes of consumers as an initial population from which a group is defined for study. However, when the study concludes it often becomes apparent that the initial population was too restrictively defined or was overly broad. This can cause more effort on the part of an organization to launch a second study or to conclude that the study was a failure.

Thus, what is needed are techniques by which the population defined for a group for a given study can be dynamically refined and adjusted as the study progresses in a manner that is not based on assumptions but is driven by the outcomes of the study itself, which are observed as the study is in progress.

SUMMARY

In various embodiments, methods and a system for dynamic population adjustments for a group associated with a study or a campaign are presented.

According to an embodiment, a method for dynamic population adjustments for a group associated with a study or a campaign is presented. A group of customers for a campaign associated with a promotion is determined. Transaction of the customers are monitored for a redeeming customer that redeems the promotion in a redeeming transaction. The redeeming transaction is modeled in multidimensional space. Other transactions for other customers that are not part of the group are monitored. The other transactions are modeled in the multidimensional space. A select number of the other customers are identified for inclusion in the group based on the modeling of the redeeming transaction and the modeling of the other transactions. Customer identifiers for the select number of other customers are provided for inclusion in the campaign.

DETAILED DESCRIPTION

Figure 1:
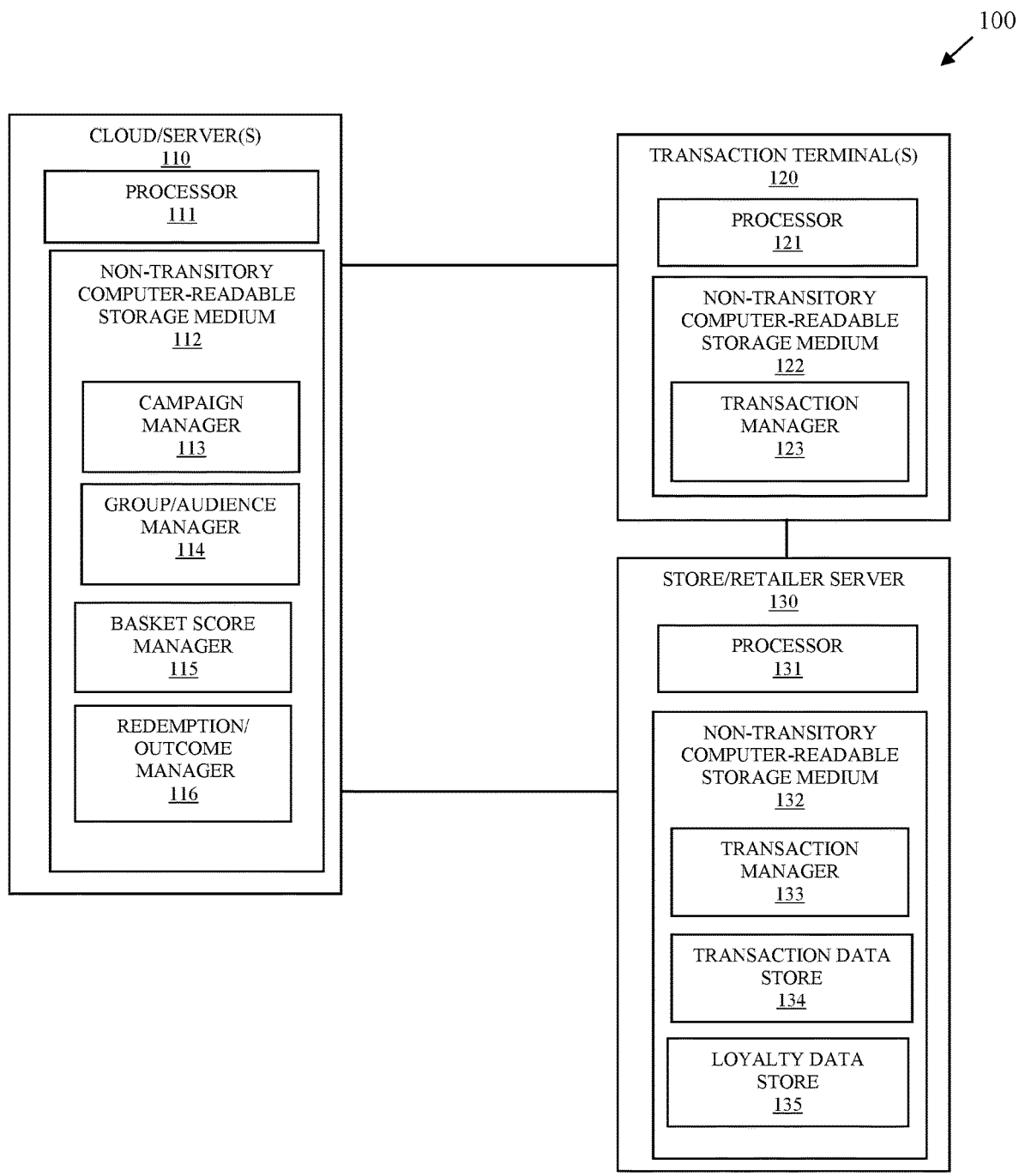
FIG. 1 is a diagram of a system for dynamic population adjustments for a group associated with a study or a campaign, according to an example embodiment.

FIG. 1 is a diagram of a system 100 for dynamic population adjustments for a group associated with a study or a campaign, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of dynamic population adjustments for a group associated with a study or a campaign, presented herein and below.

As will be discussed more completely herein, system 100 permits an initial defined audience (group) for a promotion campaign to be dynamically expanded based on redemptions made during the campaign. The dynamic expansion is based on favorable outcomes (redemptions of the promotions) where basket data (transaction history) associated with redeeming customers are obtained to identify similar baskets (transaction histories) associated with other customers. Similar customers to the redeeming customer are then added to the audience (group) for the remainder of the campaign.

The dynamic, controlled, and focused expansion to the audience can continue until the campaign concludes (set date or predefined total number of redemptions reached). This approach for dynamic population adjustments associated with a campaign provides improved success rates (promotion redemptions) for the campaign, allows smaller more focused audiences/groups to be used as the initial population of the group and allows for controlled expansion of the group, and results in more personalized customer interactions for a given retailer, since a redemption percentage for the audience is substantially increased with the techniques presented herein.

Furthermore, system 100 reduces expenses of a retailer by improved identification of customers most likely to be amenable to a given promotion, which limits the reach (total number of customers) that the retailer has to communicate with from their customer base for the campaign (more targeted and focused campaigns and promotions). Customers not likely to be amenable to the promotion are not contacted by the retailer, so these customers are not going to have an unfavorable reaction to the campaign or promotion because they are never interacted with by the retailer.

Additionally, customized content and communications from the retailer are more precisely processed ensuring that the amenable customers have a favorable opinion of the retailer.

Still further, system 100 is fully automated requiring no manual or human intervention or oversight during a given campaign or promotion.

As used herein the terms "customer" and "consumer" may be used synonymously and interchangeably.

The terms "group" and "audience" may be used synonymously and interchangeably, these terms refer to the customers being targeted for a given campaign or promotion.

A "population" refers to a segment of a retailer's customer base that is to be initially targeted for membership in the group. Note the population can initially be defined for group selection as being the entire customer base of the retailer or any custom defined segment from the customer base.

System 100 comprises a cloud/server(s) 110, transaction terminals 120, and one or more store/retailer servers 130.

Cloud/server 110 comprises a processor 111, and a non-transitory computer-readable storage medium 112. Medium 112 comprises executable instructions representing a campaign manager 113, a group/audience manager 114, a basket score manager 115, and a redemption/outcome manager 116. The executable instructions when executed by processor 111 from medium 112 causes processor 111 to perform operations discussed herein and below with respect to 113-116.

Each transaction terminal 120 comprises a processor 121 and a non-transitory computer-readable storage medium 122. Medium 122 comprises executable instructions representing a transaction manager 123. Transaction manager 123 when executed by processor 121 from medium 122 causes processor 121 to perform operations discussed herein and below with respect to transaction manager 123.

It is to be noted that each transaction terminal 120 may comprise various peripherals such as and by way of example only, a touchscreen display, a keypad, a Personal Identification Number (PIN) pad, a receipt printer, a currency acceptor, a coin acceptor, a currency dispenser, a coin dispenser, a valuable media depository, a card reader (contact-based (magnetic and/or chip) card reader and/or contactless (wireless) card reader (Near-Field Communication (NFC), etc.)), one or more integrated cameras, a bagging weigh scale, a scanner, a weigh scale, a combined scanner and weigh scale, a microphone, a speaker, a terminal status pole with integrated lights, etc.

Server/Retailer server 130 comprises a processor 131 and a non-transitory computer-readable storage medium 132. Medium 132 comprises executable instructions for a transaction manager 133. Moreover, medium 132 comprises a transaction data store 134 and a loyalty data store 135. The executable instructions when executed by processor 131 from medium 132 causes processor 131 to perform operations discussed herein and below with respect to transaction manager 133.

Campaign manager 113 provides a user-facing interface for a retailer to define a campaign and at least one promotion associated with the campaign. It is noted that this initial defining of the campaign can be done by the retailer through the retailer's loyalty system as well. In such a case, an Application Programming Interface (API) is provided for interaction between the loyalty system that initially defined the campaign and campaign manager 113 for purposes of identifying the campaign and corresponding promotion. Additionally, the transaction data produced for any given transaction is housed by transaction managers 123 and 133 in the transaction data store 134. The transaction data store 134 is accessible to redemption/outcome manager 116 for purposes of receiving customer transactions and obtaining the transaction details (basket data—items purchased for a given transaction) for each customer transaction. The transaction details provide an indication or identifier for any redeemed promotion, such that the promotion associated with the campaign is trackable.

After the campaign is defined, an initial audience is defined by group/audience manager 114 for the corresponding campaign. The population from which the group/audience manager 114 is to initially define the audience can be constrained by conditions associated with the campaign (e.g., any known cluster of customers, segments of customers, or custom-defined clusters such as limited to top-tier loyalty members, limited to customers over the age of 60, etc.).

Group/audience manager 114 then randomly selects a small number of initial customers from the loyalty data store 135 for inclusion in the initial audience/group of the campaign.

Once the initial audience is defined for the campaign, the campaign is initiated for the customed included in the initial audience by campaign manager 113 or by the retailer's loyalty system.

Transactions processed by the initial audience are monitored by obtaining transaction history or real-time transactions associated with customer identifiers of those customers. Real-time transaction may be supplied by transaction manager 123 for transaction occurring at terminals 120 or by transaction manager 133 for any online transactions of the corresponding customers. Alternatively, at predefined intervals of time, redemption/outcome manager 116 queries transaction data store 134 for transactions associated with the customer identifiers that are identified in the initial audience of the campaign.

When redemption/outcome manager 116 identifies a transaction from one of the monitored customers of the initial audience and detects a redemption on the promotion for the campaign. The transaction data for the transaction of that customer is obtained. The transaction data comprises a basket of items purchased by the customer when the redemption of the promotion was detected.

Basket score manager 115 then maps the items of the transaction to a low dimensional space and/or scores the transaction for the redeeming customer of the initial audience for the campaign and begins monitoring transactions and mapping and/or scoring transactions from the transaction data store or received from managers 123 and/or 133 in real time for other customers of the retailer that are not included in the initial audience for the campaign.

In an embodiment, both the basket data and loyalty data associated with the redeeming customer are mapped and/or scored along with the transaction occurring for customers that are not included in the initial audience for the campaign.

Basket score manager 115 processes a similarity measure algorithm, such as Cosine, Pearson's Correlation, Jaccard, Karypis, etc. for purposes of identifying a similarity between the redeeming customer and the other customers that are not included in the initial audience for the campaign. Soon the transactions of some of the customers that are not in the audience will emerge as being statistically near to or classified with the redeeming customer's basket/loyalty data based on the mappings/scores. That is, a neighborhood of customers that appear to be neighbors with the redeeming customer within the mapped multidimensional space emerges from the statistical analysis of basket/loyalty data.

Basket score manager then creates a recommendation list from the neighborhood. In an embodiment, a most frequent approach is used to identify customers to recommend for inclusion into the initial audience by weighting a proportion of the baskets for the candidate neighbors more heavily when more similar or identical to that of the redeeming customer. A predefined number of the top neighbors in the neighborhood that are most similar to the redeeming customer are then selected as the customers to recommend for inclusion in the audience for the campaign.

Basket score manager 115 provides the customer identifiers for the recommended customers to campaign manager 113 or to the retailer's loyalty system. The transactions of these customers are then monitored along with the remaining members of the initial audience for redemption and the process continues until either the campaign has reached its stated goal or ended by the retailer.

System 100 provides a target data-driven approach to managing an audience that is being targeted for a campaign or a promotion. The audience starts out small and can be randomly created or created randomly from a control cluster or segment of the retailer's customers. As outcomes are detected indicating members of the audience have redeemed a promotion associated with a campaign, the redeeming customer is statistically modeled based on the redeeming transaction and/or loyalty data associated with the redeeming customer. Non-members of the audience are then similarly modeled as they perform transactions and some of those non-members begin to cluster in a neighborhood within multidimensional space associated with the modeling as neighbors to the redeeming customer. The neighborhood of customers are evaluated using a most frequent approach and a top predefined number of customers from the neighborhood are selected for inclusion in the audience, which expands the audience for the campaign by a controlled (predefined) number of additional customers. The transactions of the expanded audience are monitored until a redemption is detected and the process repeats for expanding the audience again for the campaign until a stated goal of the campaign is reached (for example, a predefined number of customers have redeemed the promotion, a predefined date has been reached (expiration date), etc.).

System 100 provides a fully automated and statistically sound approach to dynamic population adjustments for an audience (group) of a campaign. However, the approach can be used for any study or evaluation such that the approach is not limited to retail campaigns (as long as there is a measurable and trackable mechanism to identify a goal/object/success metric of the study or evaluation similar to the promotion tracking for the campaigns). The controlled expansion of the audience results in better success rates of the campaign that are focused on amenable customers based on transaction/loyalty data of the customers (data driven).

In an embodiment, the dimensions of the multidimensional space are mapped to a product/item catalogue of items for the retailer with multiple items being clustered together in a single dimension to reduce the dimensions of the space.

In an embodiment, the transaction terminals 120 are Self-Service Terminals (SSTs), Point-Of-Sale (POS) terminals, phones, tablets, laptops, kiosks, and/or phones.

In an embodiment, the components 113-116 of cloud/server 110 are subsumed into store/retailer server 130.

The above-noted embodiments and other embodiments are now discussed with reference to FIGS. 2-3.

Figure 2:
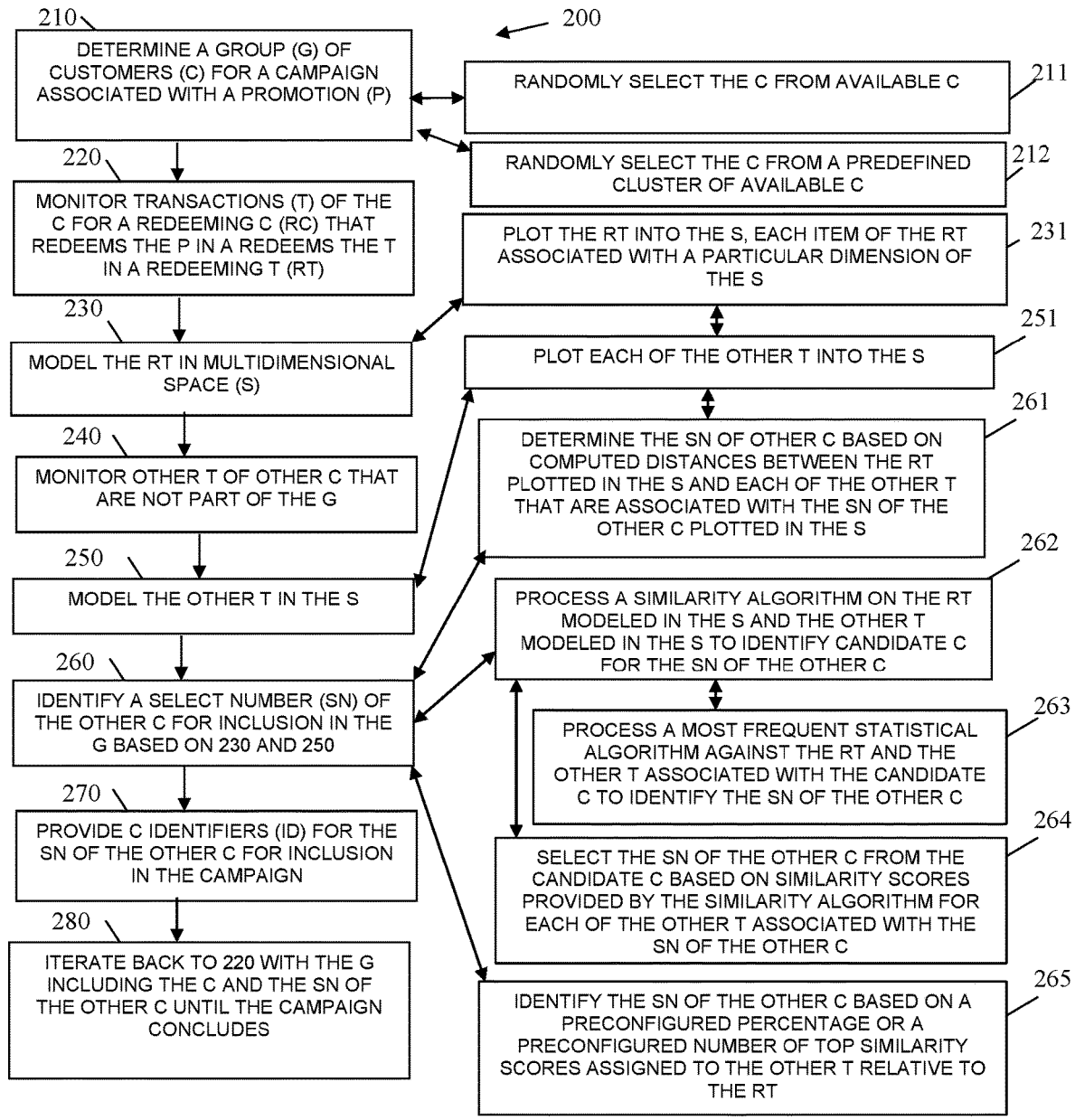
FIG. 2 is a diagram of a method for dynamic population adjustments for a group associated with a study or a campaign, according to an example embodiment.

FIG. 2 is a diagram of a method 200 for dynamic population adjustments for a group associated with a study or a campaign, according to an example embodiment. The software module(s) that implements the method 200 is referred to as a "campaign audience controller." The campaign audience controller is implemented as executable instructions programmed and residing within memory and/or a non-transitory computer-readable (processor-readable) storage medium and executed by one or more processors of a device or set of devices. The processor(s) of the device(s) that executes the campaign audience controller are specifically configured and programmed to process the campaign audience controller. campaign audience controller may have access to one or more network connections during its processing. The network connections can be wired, wireless, or a combination of wired and wireless.

In an embodiment, the campaign audience controller executes on server 120. In an embodiment, the server 120 is one of multiple servers that logically cooperate as a single server representing a cloud processing environment (cloud 120).

In an embodiment, the campaign audience controller is all or some combination of 113-116.

At 210, the campaign audience controller determines a group of customers for a campaign associated with a promotion.

In an embodiment, at 211, the campaign audience controller randomly selects the customer from available customers of a retailer's loyalty database.

In an embodiment, at 212, the campaign audience controller randomly selects the customer from a predefined cluster or segmentation of available customers of a retailer's loyalty database.

At 220, the campaign audience controller monitors transactions of the customers from a redeeming customer who redeems the promotion in a redeeming transaction at a transaction terminal or via a transaction server for an online transaction.

At 230, the campaign audience controller mathematically models the redeeming transaction in a multidimensional space (hereinafter just "space").

In an embodiment, at 231, the campaign audience controller plots the redeeming transaction into the space, each item of the redeeming transaction associated with a particular dimension of the space.

At 240, the campaign audience controller monitors other transactions associated with other customers that are not part of the group.

At 250, the campaign audience controller mathematically models the other transactions of the other customers in the space.

In an embodiment of 231 and 250, at 251, the campaign audience controller plots each of the other transactions into the space.

At 260, the campaign audience controller identifies a select number of the other customers for inclusion in the group based on 230 and 250.

In an embodiment of 251 and 260, at 261, the campaign audience controller determines the select number of the other customers based on computed distances between the redeeming transaction plotted in the space and each of the other transactions that are associated with the select number of the other customers plotted in the space.

In an embodiment, at 262, the campaign audience controller processes a similarity algorithm on the redeeming transaction modeled in the space and the other transactions modeled in the space to identify candidate customers for the select number of the other customers.

In an embodiment of 262 and at 263, the campaign audience controller processes a most frequent statistical algorithm against the redeeming transaction and the other transactions associated with the candidate customers to identify the select number of the other customers.

In an embodiment of 262 and at 264, the campaign audience controller selects the select number of the other customers from the candidate customers based on similarity scores provided by the similarity algorithm for each of the other transactions associated with the select number of the other customers.

In an embodiment, at 265, the campaign audience controller identifies the select number of the other customers based on a preconfigured percentage or a preconfigured number of top similarity scores assigned to the other transactions relative to the redeeming transaction.

At 270, the campaign audience controller provides customer identifiers for the select number of the other customers for inclusion in the campaign.

In an embodiment, at 280, the campaign audience controller iterates back to 220 with the group including the customers and the select number of the other customers until the campaign concludes or is terminated.

Figure 3:
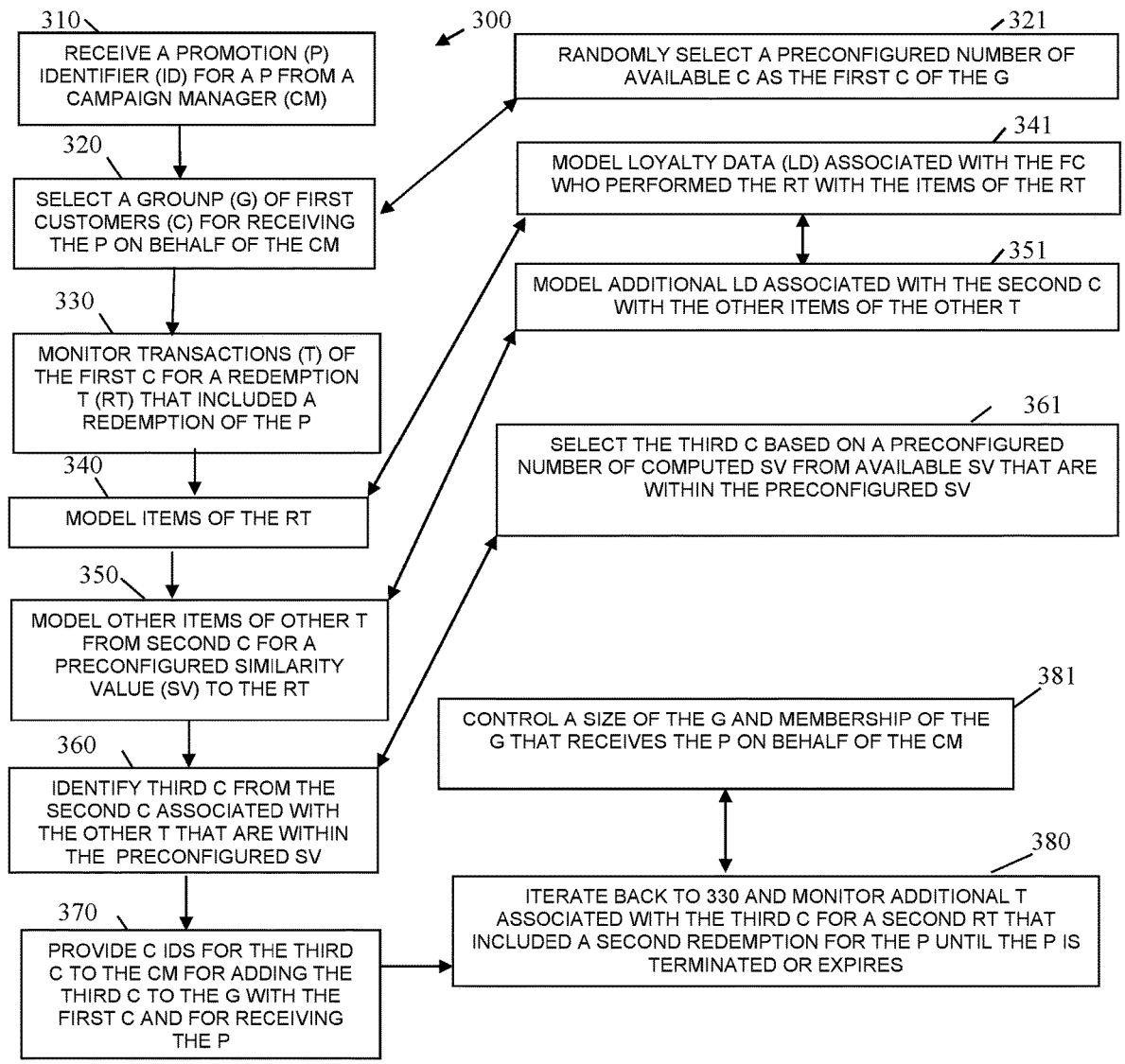
FIG. 3 is a diagram of still another method for dynamic population adjustments for a group associated with a study or a campaign, according to an example embodiment.

FIG. 3 is a diagram of a method 300 for dynamic population adjustments for a group associated with a study or a campaign, according to an example embodiment. The software module(s) that implements the method 300 is referred to as a "dynamic group membership manager." The dynamic group membership manager is implemented as executable instructions programmed and residing within memory and/or a non-transitory computer-readable (processor-readable) storage medium and executed by one or more processors of a device or set of devices. The processor(s) of the device that executes the dynamic group membership manager are specifically configured and programmed to process the dynamic group membership manager. The dynamic group membership manager may have access to one or more network connections during its processing. The network connections can be wired, wireless, or a combination of wired and wireless.

In an embodiment, the device that executes the dynamic group membership manager is server 120. In an embodiment, server 120 is one of multiple servers that cooperate and logically present as a single server associated with a cloud processing environment (cloud 120).

In an embodiment, the dynamic group membership manager is all of, or some combination of, 113-116 and/or method 200 of FIG. 2.

The dynamic group membership manager represents another and, in some ways, an enhanced processing perspective of what was discussed above for the method 200.

At 310, the dynamic group membership manager receives a promotion identifier for a promotion from a campaign manager.

At 320, the dynamic group membership manager selects a group of first customers for receiving the promotion on behalf of the campaign manager.

In an embodiment, at 321, the dynamic group membership manager randomly selects a preconfigured number of available customers as the first customers for the group.

At 330, the dynamic group membership manager monitors transactions of the first customers for a redemption transaction that included a redemption of the promotion based on detection of the promotion identifier within the redemption transaction.

At 340, the dynamic group membership manager models items of the redemption transaction.

In an embodiment, at 341, the dynamic group membership manager models loyalty data associated with the first customer who performed the redemption transaction with the items of the redemption transaction.

At 350, the dynamic group membership manager models other items of other transactions from second customers for a preconfigured similarity value to the redemption transaction.

In an embodiment of 341 and 350, at 351, the dynamic group membership manager models additional loyalty data associated with the second customers with the other items of the other transactions.

At 360, the dynamic group membership manager identifies third customers from the second customers associated with the other transaction that are within the preconfigured similarity value.

In an embodiment, at 361, the dynamic group membership manager selects the third customers based on a preconfigured number of computed similarity values from available similarity values that are within the preconfigured similarity value.

At 370, the dynamic group membership manager provides customer identifiers for the third customers to the campaign manager for adding the third customers to the group with the first customers and for receiving the promotion of the campaign from the campaign manager.

In an embodiment, at 380, the dynamic group membership manager iterates back to 330 and monitors additional transactions associated with the third customers for a second redemption transaction that included a second redemption for the promotion based on the promotion identifier until the promotion is terminated or expires.

In an embodiment of 380 at 381, the dynamic group membership manager controls a size of the group and membership of the group that receives the promotion on behalf of the campaign manager.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   determining, by a processor of a server, a group of customers for a campaign associated with a promotion;
   monitoring, by the processor, transactions of the customers for a redeeming customer that redeems the promotion in a redeeming transaction;
   modeling, by the processor, the redeeming transaction in multidimensional space by assigning each unique item a dimension in the multidimensional space and plotting items included in the redeeming transaction as a plot for the redeeming transaction within the multidimensional space;
   monitoring, by the processor, other transactions of other customers that are not part of the group;
   modeling, by the processor, the other transactions in the multidimensional space by plotting each of the other transaction in the multidimensional space using the corresponding items that are associated with the corresponding other transaction;
   identifying, by the processor, a select number of the other customers for inclusion in the group based on the modeling of the redeeming transaction and the modeling of the other transactions by identifying specific transactions and their corresponding plots in multidimensional space as being with a predefined distance of the redeeming transaction within the multidimensional space making the select number of the other customers associated with the specific transaction neighbors with the customer within the multidimensional space; and
   providing, by the processor, customer identifiers for the select number of other customers for inclusion in the campaign.

2. The method of claim 1 further comprising iterating, by the processor, back to the monitoring of the transactions with the group including the customers and the select number of the other customers until the campaign concludes.

3. The method of claim 1, wherein determining further includes randomly selecting the customers from available customers.

4. The method of claim 1, wherein determining further includes randomly selecting the customers from a predefined cluster of available customers.

5. The method of claim 1, wherein identifying further includes processing a similarity algorithm on the redeeming transactions modeled in the multidimensional space and the other transactions modeled in the multidimensional space to identify candidate customers for the select number of the other customers.

6. The method of claim 5, wherein processing further includes processing a most frequent statistical algorithm against the redeeming transaction and the other transactions associated with the candidate customer to identify the select number of the other customers.

7. The method of claim 5, wherein processing further includes selecting the select number of the other customers from the candidate customers based on similarity scores provided by the similarity algorithm for each of the other transactions that are associated with the select number of the other customers.

8. The method of claim 1, wherein identifying further includes identifying the select number of the other customers based on a preconfigured percentage or a preconfigured number of top similarity scores assigned to the other transactions relative to the redeeming transaction.

9. A method, comprising:
   receiving, by a processor of a server, a promotion identifier for a promotion from a campaign manager;
   selecting, by the processor, a group of first customers for receiving the promotion on behalf of the campaign manager;
   monitoring, by the processor, transactions of the first customers for a redemption transaction that included a redemption of the promotion;
   modeling, by the processor, items of the redemption transaction by assigning a unique dimension in multidimensional space to each unique item and using the items of the redemption transaction to plot the redemption transaction within the multidimension space;
   modeling, by the processor, other items of other transactions from second customers for a preconfigured similarity value to the redemption transaction by plotting each of the other transactions using dimensional locations of other items associated with the corresponding other transaction to plot the corresponding other transaction;
   identifying, by the processor, third customers from the second customers associated with the other transactions that are within the preconfigured similarity value based on the other transactions when plotted in the multidimensional space being within a predefined distance of the redemption transaction making the third customers neighbors in multidimensional space to the third customers; and
   providing, by the processor, customer identifiers for the third customers to the campaign manager for adding the third customer to the group with the first customers and for receiving the promotion.

10. The method of claim 9 further comprising, iterating, by the processor, back to the monitoring the transactions and monitoring additional transactions associated with the third customers for a second redemption transaction that included a second redemption for the promotion until the promotion is terminated or expires.

11. The method of claim 10 further comprising, controlling, by the processor, a size of the group and membership of the group that receives the promotion on behalf of the campaign manager.

12. The method of claim 9, wherein selecting further includes randomly selecting a preconfigured number of available customers as the first customers of the group.

13. The method of claim 9, wherein modeling the items further includes modeling loyalty data associated with the first customer who performed the redemption transaction with the items of the redemption transaction.

14. The method of claim 13, wherein modeling the other items further includes modeling additional loyalty data associated with the second customers with the other items of the other transactions.

15. The method of claim 9, wherein identifying the third customers further includes selecting the third customers based on a preconfigured number of top computed similarity values from available computed similarity values that are within the preconfigured similarity value.

16. A system, comprising:
    a cloud processing environment comprising at least one processor and a non-transitory computer-readable storage medium;
    the non-transitory computer-readable storage medium comprises executable instructions;
    the executable instructions executed by the at least one processor from the non-transitory computer-readable storage medium causing the at least one processor to perform operations comprising:

defining a size of a group and first members of the group for a campaign associated with a promotion;

monitoring transactions of the group for a redemption of the transaction associated with a redemption transaction;

modeling the redemption transaction based on a basket of items comprised in the transaction by assigning a unique dimension to each item of the basket and plotting the items of the basket in multidimensional space as a plot of the redemption transaction within the multidimensional space;

monitoring other transactions associated with non-members of the group;

modeling the other transactions based on other baskets of items comprised in the other transactions by plotting each of the other transactions using plots for the items of the corresponding other basket associated with the corresponding other transaction to plot the corresponding other transaction within the multidimensional space;

identifying similarities between select ones of the other transactions and the redemption transaction based on the modeling of the redemption transaction and the other transactions by identifying a preconfigured distance within the multidimensional space between the redemption transaction and the select ones of the other transactions;

selecting a preconfigured number of the select ones of the other transactions based on the corresponding similarities;

identifying member identifiers associated with the preconfigured number of the other transactions, wherein the member identifiers associated with second members;

adding the second members to the group increasing the size of the group by the preconfigured number; and iterating back to the monitoring of the transactions with the second members added to the group until the campaign or the promotion ends or is terminated.

17. The system of claim 16, wherein the transaction and the other transactions are processed on transaction terminals, and wherein the transaction terminals are Self-Service Terminals (SSTs), Point-Of-Sale (POS) terminals, kiosks, tablets, laptops, phones, and wearable processing devices.

* * * * *